(12) United States Patent
Tabary et al.

(10) Patent No.: US 8,263,533 B2
(45) Date of Patent: Sep. 11, 2012

(54) METHOD OF TREATING UNDERGROUND FORMATIONS OR CAVITIES BY MICROGELS

(75) Inventors: René Tabary, Saint-Germain-en-Laye (FR); Guy Chauveteau, Nanterre (FR); Paul Mallo, Croissy-sur-Seine (FR); Olivier Braun, Naves (FR); Eric Vilain, Saint-Cloud (FR); Alain Zaitoun, Paris (FR)

(73) Assignees: IFP, Cedex (FR); Ste Exploit. de Produits pour Industries Chimiques, Cedex (FR)

( * ) Notice: Subject to any disclaimer, the term of this patent is extended or adjusted under 35 U.S.C. 154(b) by 1062 days.

(21) Appl. No.: 11/574,172

(22) PCT Filed: Aug. 22, 2005

(86) PCT No.: PCT/FR2005/002124
§ 371 (c)(1),
(2), (4) Date: Sep. 28, 2007

(87) PCT Pub. No.: WO2006/024795
PCT Pub. Date: Mar. 9, 2006

(65) Prior Publication Data
US 2008/0096774 A1    Apr. 24, 2008

(30) Foreign Application Priority Data

Aug. 25, 2004 (FR) .................... 04 09100

(51) Int. Cl.
*C09K 8/588* (2006.01)
*C09K 8/24* (2006.01)
*C09K 8/36* (2006.01)
*C23F 11/18* (2006.01)
*C08J 3/02* (2006.01)

(52) U.S. Cl. ........ 507/221; 507/117; 507/120; 507/225; 507/271; 507/903; 516/99; 516/102

(58) Field of Classification Search .................. 507/117, 507/120, 225, 271, 903, 221; 516/99, 102
See application file for complete search history.

(56) References Cited

U.S. PATENT DOCUMENTS

| | | | | |
|---|---|---|---|---|
| 3,780,806 A * | 12/1973 | Bott | .............. | 166/275 |
| 4,172,066 A | 10/1979 | Zweigle et al. | | |
| 4,681,912 A | 7/1987 | Durand et al. | | |
| 6,197,287 B1 | 3/2001 | Mallo | | |
| 6,513,592 B2 * | 2/2003 | Espin et al. | ............ | 166/295 |
| 6,579,909 B1 * | 6/2003 | Chauveteau et al. | ........ | 516/99 |
| 2003/0235547 A1 * | 12/2003 | Braun et al. | ........... | 424/70.11 |

FOREIGN PATENT DOCUMENTS

| | | |
|---|---|---|
| EP | 1 086 976 | 3/2001 |
| EP | 1 086 976 A | 3/2001 |
| FR | 2 565 623 | 12/1985 |
| FR | 2 565 623 A | 12/1985 |
| WO | WO 99/36445 | 7/1999 |
| WO | WO 01/21726 A1 | 3/2001 |
| WO | WO 01/96707 A1 | 12/2001 |

OTHER PUBLICATIONS

Exxon Mobil MSDS Datasheet of ISOPAR M.*

* cited by examiner

*Primary Examiner* — Ling Choi
*Assistant Examiner* — Aiqun Li
(74) *Attorney, Agent, or Firm* — Antonelli, Terry, Stout & Kraus, LLP.

(57) ABSTRACT

The present invention relates to a method of treating porous and permeable underground formations or cavities of reservoir rock or sand foundation type. The method consists in injecting a liquid composition comprising microgels into the formations in order to reduce the production of water, gas or sands, and/or for zone abandonment.

15 Claims, No Drawings

METHOD OF TREATING UNDERGROUND FORMATIONS OR CAVITIES BY MICROGELS

FIELD OF THE INVENTION

The present invention relates to a method of using microgels obtained from water-in-oil latex or from crosslinked polymers in form of powder, and to their field of application as thickening agents and/or selective permeability reducing agents in the petroleum industry, notably in the sphere of water inflow prevention, profile control, enhanced oil recovery by injection of viscosifiers.

BACKGROUND OF THE INVENTION

Various products or methods exist and are already utilized for these various uses. Treatments using polymers are known in particular in the field of water inflow prevention, but they remain limited to relatively low water-producing zone permeabilities (on average below 300 mD) because of the size limitation of these polymers.

The water inflow prevention methods based on polymer gels provided in the petroleum industry are currently not very reliable and often use polluting products based on chromium salts or resins. The methods currently on the market most often use plugging gels or diluted gels (low polymer and crosslinking agent concentration, colloidal dispersion gels), the results remain uncertain mainly because of problems such as:

absence of control of the gelation kinetics linked with the variability of the physico-chemical and hydrodynamic parameters between the surface and the formation, involving a risk of treatment inefficiency (absence of gelation) or, conversely, a risk of irreparable well damage (gel setting), retention and adsorption of the crosslinking agent on the reservoir rock, non-control of the characteristics of the gel formed, of its positioning, of its propagation and of its water/oil selectivity properties.

On the other hand, the increasing number of mature fields, the development of complex wells (horizontal, subsea, multi-branch wells) and the reliability problems linked with bottomhole separation techniques have led oilmen to take an active interest in self-selective water inflow prevention treatments that can be injected directly (bullhead type injection) into the reservoir formation, i.e. without zone isolation by means of specific equipments.

When a producing well is treated by polymer injection, the primary mechanism is based on an adsorption of the polymer molecules on the mineral making up the layer swept by the polymer. After treating, when the well produces again, the molecules nearly irreversibly adsorbed on the wall afford a maximum amount of resistance to the flow of the water circulating mainly in the vicinity of this wall and thus reduce its mobility. In the presence of a hydrocarbon phase (oil or gas), the capillary pressure exerted by the fluid making up this phase is sufficient to crush the molecules adsorbed on the walls of the pore restrictions and thus not to hinder its mobility. The molecules, deformable in their "compressed" state, have the capacity to swell in the presence of a water phase and thus to reduce its mobility. This type of product providing a selective permeability reduction between water, oil and gas is referred to as "Relative Permeability Modifier", it thus involves a reduction of the water permeability in the drain holes of higher permeability, therefore favouring:

1) production improvement (Water-Oil Ratio or Gas-Oil Ratio decrease),
2) more efficient sweep of the layers of lower permeability, in general those containing still mobilizable oil,
3) diversion of the water to the less permeable zones which are therefore less swept in the drainage methods using water injection (profile correction in injection wells).

A microgel preparation method is described in document EP-1,086,976. It is based on gelation performed under shearing of a mixture of polymer and of crosslinking agent. According to the method, a gelling composition comprising a polymer and a polymer crosslinking additive is injected into a porous and permeable medium, and a mono-disperse solution of microgels of substantially constant size is recovered at the outlet.

The applicant has thus taken an interest in chemical species easy to pass into solution, stable, i.e. having a repellent character (absence of interactions), and of controlled size.

The present application relates to a method using microgels of chemical type, of controlled and stable size, optimized according to the reservoir characteristics for which the application is desired.

The advantages of this invention mainly lie in the fact that:
a) the size of the microgels is notably larger (1 to 10 times) than the size of a commercial polymer of high molecular weight,
b) the size of the microgels can be dimensioned according to the mean permeability of the layer or of the reservoir zone by which the water is produced in larger amounts, generally zones with a permeability ranging between 0.001 and some Darcy (1 Darcy=0.98693 $\mu m^2$).

In the present invention, the applicant has sought microgels having the following properties:
deformable,
stable in solution,
stable towards electrolytes,
temperature stable,
mechanically stable, i.e. when subjected to strong shearing,
capable of irreversible adsorption.

The capacity of the microgels according to the invention to meet in the widest range all of these conditions allows to provide a new method, much more reliable than those currently available on the market.

According to the invention, the microgels are non-toxic, without harmful residues, thus allowing to satisfy the evolution of the European regulations on dangerous substances and standards on emissions.

SUMMARY OF THE INVENTION

The present invention thus relates to a method of treating formations, wherein the following stages are carried out:
preparing a composition comprising microgels by mixing in a solvent, under stirring, an amount representing 0.01% to 60% by mass of said composition of:
either an inverse latex consisting of an oil phase, an aqueous phase, at least one water-in-oil (W/O) type emulsifier, at least one oil-in-water (O/W) type emulsifier, 20% to 60%, preferably 25% to 45% by weight of a crosslinked anionic polyelectrolyte based on either at least one strong acid function monomer copolymerized with at least one neutral monomer, or a weak acid function monomer copolymerized with at least one neutral monomer, or a powdered polymer obtained by azeotropic distillation, atomization or precipitation of said inverse latex, injecting said composition into the porous and permeable formation in which water and/or oil and/or gas flow, so as to selectively reduce the water permeability and/or to reduce sediment show by adsorption of the microgels in the formation.

The solvent is preferably more or less salted water, but it can also be an organic phase such as an oil. Of course, the solvent can also be an aqueous and organic mixture.

In the definition of the polyelectrolyte contained in the inverse latex as defined above:

the crosslinking agent is preferably selected from among ethylene glycol dimethacrylate, diethylene glycol diacrylate, sodium diallyloxyacetate, ethylene glycol diacrylate, diallyl urea, triallylamine, trimethylol propanetriacrylate or methylene-bis-(acrylamide) or an organometallic type compound selected from column IV in Mendeleiev's table (Ti, Zr, Hf, Th);

the strong acid function of the monomers can notably be the sulfonic acid function or the phosphonic acid function. Said monomers can be, for example, styrenesulfonic acid, partly or totally salified, or preferably 2-methyl 2-[(1-oxo 2-propenyl) amino] 1-propanesulfonic acid (also referred to as 2-acrylamido 2-methyl propanesulfonic acid), partly or totally salified;

the weak acid function of the monomers can notably be the partly salified carboxylic acid function. Said monomers can be, for example, acrylic acid, methacrylic acid, itaconic acid, maleic acid or 3-methyl 3-[(1-oxo 2-propenyl) amino] butanoic acid, partly or totally salified;

the neutral monomers can notably be selected from among acrylamide, methacrylamide, diacetoneacrylamide, dimethylacrylamide, N-isopropyl acrylamide, (2-hydroxy ethyl) acrylate, (2,3-dihydroxy propyl) acrylate, (2-hydroxy ethyl) methacrylate, (2,3-dihydroxy propyl) methacrylate, an ethoxylated derivative of molecular weight ranging between 400 and 1000 of each one of these esters or vinyl pyrrolidone;

for the strong acid function or weak acid function monomers, the term salified indicates more particularly the alkaline metal salts such as sodium or potassium salts, the nitrogenated base salts such as ammonium salt or monoethanolamine salt (HO—$CH_2$—$CH_2$—$NH_4^+$);

the water-in-oil (W/O) type emulsifier can consist of either a single surfactant or a mixture of surfactants, provided that said mixture has a sufficiently low HLB value to induce water-in-oil emulsions. The water-in-oil type emulsifiers used can be, for example, sorbitan esters, such as sorbitan oleate, such as the one marketed by the SEPPIC Company under the tradename MONTANE™ 80, sorbitan isostearate, such as that marketed by the SEPPIC Company under the tradename MONTANE™ 70, or sorbitan sesquioleate such as that marketed by the SEPPIC Company under the tradename MONTANE™ 83. There can also be certain polyethoxylated sorbitan esters, for example pentaethoxylated sorbitan monooleate such as that marketed by the SEPPIC Company under the tradename MONTANOX™ 81, or pentaethoxylated sorbitan isostearate such as that marketed by the SEPPIC Company under the tradename MONTANOX™ 71. There can also be diethoxylated oleocetylic alcohol such as that marketed by the SEPPIC Company under the tradename SIMULSOL™ OC 72, polyesters of molecular weight ranging between 1000 and 3000, products of the condensation between a poly (isobutenyl) succinic acid or its anhydride and a poly ethylene glycol, such as HYPERMER™ 2296 marketed by the UNIQEMA Company, or block copolymers of molecular weight ranging between 2500 and 3500, such as HYPERMER™ B246 marketed by the UNIQEMA Company, or SIMALINE™ IE 200 marketed by the SEPPIC Company;

what is referred to as "oil-in-water" type emulsifier are emulsifiers having a sufficiently high HLB value to provide oil-in-water emulsions such as ethoxylated sorbitan esters like polyethoxylated sorbitan oleate with 20 moles ethylene oxide, marketed by the SEPPIC Company under the tradename MONTANOX™ 80, polyethoxylated sorbitan laurate with 20 moles ethylene oxide, marketed by the SEPPIC Company under the tradename MONTANOX™ 20, polyethoxylated ricine oil with 40 moles ethylene oxide marketed under the tradename SIMULSOL™ OL50, decaethoxylated oleodecylic alcohol marketed by the SEPPIC Company under the tradename SIMULSOL™ OC 710, heptaethoxylated lauric alcohol marketed under the tradename SIMULSOL™ P7, decaethoxylated nonylphenol marketed under the tradename SYNPERONIC™ NP-10, or polyethoxylated sorbitan hexaoleates marketed by the UNIQEMA Company under the tradenames G-1086 and G-1096;

the oil phase can consist of either a commercial mineral oil containing saturated hydrocarbons such as paraffins, isoparaffins, cycloparaffins, having at ambient temperature a density ranging between 0.7 and 0.9 kg/dm$^3$ and a boiling-point temperature above about 180° C. such as, for example, MARCOL™ 52 marketed by EXXON CHEMICAL, EXXSOL D100 or ISOPAR M, or a synthesis oil, or a vegetable oil or any mixture of such oils.

DETAILED DESCRIPTION

Other features and advantages of the present invention will be clear from reading the description hereafter of non limitative embodiment examples.

The crosslinked polymers used according to the invention are made by the SEPPIC Company (France) and they can come in the forms described hereafter.

The principle of the preparation of inverse latex is described in documents U.S. Pat. No. 6,197,287, EP-1,047, 716, U.S. Pat. No. 6,375,959, EP-1,010,708, WO-9,942,521. It consists in preparing an aqueous phase containing, among other things, monomers, for example acrylamide and sodium 2 acrylamido 2 methyl propane sulfonate, at least one crosslinking agent and optionally various technological additives such as: chain-limiting agent, metallic species complexing agent, and an organic phase containing, among other things, oil and one or more emulsifiers. The aqueous phase is fed into the organic phase under stirring, then it is subjected to the action of strong stirring by means of an Ultra Turrax or Silverson type device. The emulsion obtained is then subjected to nitrogen bubbling, then the polymerization reaction is started in the presence of a free radical initiating agent. After polymerization, the oil-in-water type emulsifier is added.

The composition according to the application intended notably for water inflow prevention, profile control, reservoir sweep (chemical flooding), sand consolidation, sand foundation sealing, zone abandonment, etc., can comprise addition of a crosslinking agent allowing the microgels to be crosslinked with one another.

What is referred to as a crosslinked polymer is a non-linear polymer in the state of three-dimensional network, that can swell in the presence of water and called microgel.

The crosslinking agent is generally used in the molar proportion expressed in relation to the monomers used of 0.002% to 0.5%, preferably 0.002% to 0.25%. This low crosslinking rate allows the microgels to have suitable viscoelastic properties and notably a high deformation capacity. This type of microgel is referred to as "deformable" (soft microgel) in contrast with microgels with a high crosslinking degree close to hard spheres. These microgels having a high deformation capacity potentially are good RPM (Relative Permeability Modifiers) agents insofar as they exhibit no or little resistance to oil.

Considering their rheologic characteristics, these microgels are of course not suited for blocking the interstitial spaces between the solids in underground formations.

Inverse latexes contain between 10% and 90% water. The oil phase of the composition represents 10% to 90%, preferably 20% to 25% of the total weight of the composition.

Latexes generally contain 2.5% to 15% by weight, preferably 4% to 9% by weight of emulsifiers as defined above, among which 20% to 50% of the total weight of emulsifiers present are of water-in-oil (W/O) type and 80% to 50% of the total weight of the emulsifiers are of oil-in-water (O/W) type.

The microgels or latexes can also contain various additives such as complexing agents, transfer agents, or chain length limiting agents.

Powdered crosslinked polymers can be freed of the aforementioned additives during the precipitation stage.

The present application mainly concerns treatment of oil or gas producing wells, or gas storage wells, or more generally of rocky formations. Treatment of this type of well is performed over a limited distance around the well (some meters), it is intended for water inflow prevention, gas show prevention. It can also relate to other similar fields such as profiles control, enhanced recovery by sweep (chemical flooding) from injection wells, sand consolidation, sealing treatments (mine well), or zone abandonment.

Water inflow prevention treating can be carried out using plugging agents (cements, resins), mechanical means (packers) or polymer-based treatments. Setting a packer or a cement plug requires precise knowledge of the zone through which the water inflow occurs, it imposes a completion type suited to selective injection, the technique requires workover operations and it is therefore expensive. Bullhead type polymer injection techniques, i.e. without zone isolation, are more attractive because they are much easier to implement and above all less expensive.

One advantage of the method using the formulations of the present application lies in the fact that it can be applied to formations without having to isolate or to protect the hydrocarbon producing zone(s) during the formulation injection stage.

The composition comprising the microgels is intended to be injected into formations where the water zones have notably higher permeabilities than the oil zones, thus these microgels have a propensity to invade the zones of higher permeability, i.e., in most cases, the water zones. In fact, it would be harmful to use a microgel injection in formations where:
 the permeability of the oil zones is higher than that of the water zones,
 the pressure in the oil zones is lower than in the water zones and could thus induce a decrease in terms of oil production, or even lead to well shutdown.

One advantage of the method implementing the present application lies in the fact that the microgels injected, whose size is notably larger than that of the polymers commonly injected (alone or in the presence of gelling agents), enter over a very short distance the low-permeability zones. This property is due to the combination of their large dimension (micronic size) and of the great thickness of the adsorbed layer (monolayer) linked with their adsorption.

In the case of 1.5 µm microgels, the water permeability reduction is of the order of 20 in a 200-mD Berea sandstone and it should be much more in the case of lower permeabilities. Thus, the penetration distances in a two-layer model of permeability 200 mD and 1000 mD would be in a ratio of 1:100.

Another advantage of microgels lies in the fact that they are injected under diluted conditions, thus favouring selective positioning in zones of higher permeability, in general the zones through which water is mainly produced.

After the treatment performed with the microgels, when the well produces again, an oil or gas permeability reduction can however occur in the hydrocarbon zone. However, once the injected fluid (microgel solution) is reproduced, it is replaced by the hydrocarbon. Because of the capillary pressure alone, the microgels of deformable nature are then compressed on the wall of the pore restrictions, thus allowing the hydrocarbon phase to flow towards the producing well without its relative permeability being altered.

When the crosslinked polymer is used in form of inverse latex, it can be used non-diluted, or diluted in oil, or preferably in water with a proportion by weight above 0.01%. When the crosslinked polymer is used in form of powder, it can be diluted in water with a proportion by weight ranging between 0.01 and 60%.

Passing the microgels according to the invention into solution is much faster than with conventional polymer powders. Dilution of the commercial solution can be achieved in a water of preferably moderate salinity, preferably between 0% and 2% TDS (Total Dissolved Salt), and preferably under rather strong shearing in order to perfectly break the emulsion. This water can be production water or a mixture of production water and of softer water (river water, tap water . . . ), or any other type of water (river water, tap water, sea water, synthetic water . . . ) so as to meet the recommendations relative to the salinity for optimized solution.

The microgels can be advantageously injected in form of inverse latex, either pure or diluted in an organic phase (diesel oil, mineral oil). This injection mode is particularly suitable for formations sensitive to water injection because of a destabilization of the rock or of a low permeability causing notable oil or gas permeability losses induced by a water saturation increase in the swept zone. Injection of the inverse latex in hydrocarbon phase can be done at concentrations ranging between 0.1 and 90%.

The synthesized microgels in emulsion can then be isolated in form of a powder. They can thereafter be passed into solution again and recover the same properties. The microgels in powdered form are also passed into solution under rather strong shearing as the powder is introduced in a water of the same type as the water mentioned concerning the emulsion, then under more moderate stirring during the maturation stage.

The pH value at which the present composition is used ranges between 4 and 11, preferably between 5 and 9.

According to the well type, it can be judicious to inject a first fluid or preflush (water, polymer alone, diversion fluid, . . . ) prior to injecting the microgel solution.

The field of application of the present patent application relates to reservoirs whose temperature ranges between 20° C. and 200° C., preferably between 20° C. and 150° C.

The field of application of the present patent application relates to reservoirs whose salinity ranges between 0.1 g/l and 350 g/l TDS, preferably between 0.1 g/l and 100 g/l TDS.

Finally, the object of the present application is thus a microgel formulation intended for the petroleum industry and for well treatment as defined above. The wells can be vertical, horizontal or of complex architecture; the wells can be open holes or gravel pack completed holes, perforated cased boreholes, perforated tubes, . . . .

The microgels can be advantageously optimized according to the characteristics of the formation to be treated.

The result expected when using microgel solutions is to increase the proportion of the production of the hydrocarbon phase (oil or gas) in relation to that of the aqueous phase (water) and thus to reduce the management cost of the water produced. Another advantage lies in the fact that the well production rate can be increased because of the lightening of the hydrostatic column induced by the reduction of the water fraction in the well production.

In the case of formations containing sand or mobile fine particles, adsorption of the microgels according to the invention favours holdup of these particles and therefore slows down or even eliminates sand encroachment or equivalent phenomena in the drain holes drilled in the formation.

Soil foundations are advantageously stabilized and sealed (at least great permeability reduction) by injection of the liquid composition according to the invention.

The following examples illustrate the present invention without however limiting it.

Example 1

Preparation of an AMPS-AM Copolymer Inverse Latex Partly or Totally Salified, in Form of Sodium Salt Crosslinked with Triallylamine (AMPS/AM=5/95)

The following is fed into a beaker under stirring:
350 g permuted water,
69.2 g of a commercial solution with 55% by weight 2-methyl-2-[(1-oxo-2-propenyl)amino]-1-propanesulfonic acid salt (AMPS),
236.1 g acrylamide (AM),
0.45 g of a commercial solution with 40% sodium diethylene triamine pentacetate, and
0.36 g triallylamine.

The pH value of the aqueous phase described above is adjusted to 3.5 and the amount of aqueous phase is completed up to 680 g by adding permuted water.

In parallel, an organic phase is prepared by successively feeding into a beaker under stirring:
220 g EXXSOL™ D100,
27.5 g MONTANE™ 80 VG (sorbitan oleate marketed by the SEPPIC Company), and
0.1 g azo-bis-isobutyronitrile.

The aqueous phase is progressively introduced into the organic phase, then subjected to strong mechanical stirring by means of a device of Ultra-Turrax™ type marketed by the IKA Company.

The emulsion obtained is then transferred to a polymerization reactor. The emulsion is subjected to sustained nitrogen bubbling so as to remove the oxygen and cooled to about 8-10° C.

5 ml of a solution containing 0.42% (by weight) cumene hydroperoxide in isohexadecane is then added.

After a sufficient time for homogenization of the solution, an aqueous sodium metabisulfite solution (0.2 g in 100 ml water) is then introduced in a proportion of 0.5 ml/minute. Introduction is carried out for about 60 minutes.

During this introduction, the temperature is allowed to rise in the polymerization reactor up to the final polymerization temperature. The reaction medium is then maintained for about 90 minutes at this temperature. It is then cooled to a temperature of about 35° C. and 35 g heptaethoxylated lauric alcohol (7 OE) are slowly introduced.

The inverse latex thus obtained is recovered after filtration.

Example 2

Preparation of an AMPS-AM Copolymer Inverse Latex Partly or Totally Salified, in Form of Sodium Gel Crosslinked with Triallylamine (AMPS/AM=15/85)

The following is fed into a beaker under stirring:
270 g permuted water,
218.6 g of a commercial solution with 55% by weight 2-methyl-2-[(1-oxo-2-propenyl)amino]-1-propanesulfonic acid salt,
181.0 g acrylamide,
0.45 g of a commercial solution with 40% sodium diethylene triamine pentacetate, and
0.36 g triallylamine.

The pH value of the aqueous phase described above is adjusted to 3.5 and the amount of aqueous phase is completed up to 680 g by adding permuted water.

In parallel, an organic phase is prepared by successively feeding into a beaker under stirring:
220 g EXXSOL™ D100,
27.5 g MONTANE™ 80 VG (sorbitan oleate marketed by the SEPPIC Company), and
0.1 g azo-bis-isobutyronitrile.

The aqueous phase is progressively introduced into the organic phase, then subjected to strong mechanical stirring by means of a device of Ultra-Turrax™ type marketed by the IKA Company.

The emulsion obtained is then transferred to a polymerization reactor. The emulsion is subjected to sustained nitrogen bubbling so as to remove the oxygen and cooled to about 8-10° C.

5 ml of a solution containing 0.42% (by weight) cumene hydroperoxide in isohexadecane is then added.

After a sufficient time for homogenization of the solution, an aqueous sodium metabisulfite solution (0.2 g in 100 ml water) is then introduced in a proportion of 0.5 ml/minute. Introduction is carried out for about 60 minutes.

During this introduction, the temperature is allowed to rise in the polymerization reactor up to the final polymerization temperature. The reaction medium is then maintained for about 90 minutes at this temperature. It is then cooled to a temperature of about 35° C. and 35 g heptaethoxylated lauric alcohol (7 OE) are slowly introduced.

The inverse latex thus obtained is recovered after filtration.

Example 3

Preparation of a Copolymer Inverse Latex (AMPS/AM=40/60) Crosslinked with Triallylamine (i) An organic phase is prepared by introducing under stirring 27.5 g MONTANE™ 80 (sorbitan oleate) in 220 g EXXSOL™ D100, then by adding 0.1 g azo-bis(isobutyronitrile);

(ii) An aqueous phase is prepared by mixing under stirring:
   50 g water,
   127.8 g acrylamide (AM),
   496.1 g of a commercial solution with 55% 2-acrylamido-2-methylpropanesulfonic acid sodium salt (AMPS),
   0.31 g triallylamine,
   0.45 g of a commercial solution with 40% sodium diethylenetriamine pentaacetate.
The pH value of the aqueous phase is adjusted to 5.3 by adding the required amount of 2-acrylamido-2-methylpropanesulfonic acid (about 3 g). The total amount of aqueous phase is then adjusted to 680 g by addition of water.
(iii) The aqueous phase is then dispersed under stirring in the oil phase, then this combination is subjected to the action of strong shearing by means of a turbine of Ultra-Turrax™ or Silverson™ type. The inverse emulsion thus obtained is then subjected to nitrogen bubbling so as to remove the dissolved oxygen.
(iv) After cooling the inverse emulsion to about 8-10° C., the polymerization reaction is initiated by adding an oxyreducing pair: cumene hydroperoxide/sodium metabisulfite. The temperature rises up to about 80° C. and the polymerization reaction is allowed to continue until a temperature stage indicating the end of the reaction is reached.
(v) The reaction medium is then maintained at this temperature so as to eliminate the residual monomers. 35 g SIMULSOL™ P7 (heptaethoxylated lauric alcohol) are then added at about 35° C. The desired inverse latex is collected after filtration.

Example 4

Preparation of a Copolymer Inverse Latex (AM-AA=80/20) Partly Salified, in Form of Sodium Salt Crosslinked with Methylene Bis(Acrylamide)

(i) An organic phase is prepared by introducing under stirring 27.5 g MONTANE™ 80 in 220 g EXXSOL™ D100, then by adding 0.1 g azo-bis(isobutyronitrile);
(ii) An aqueous phase is prepared by introducing:
   350 g water,
   199.0 g acrylamide (AM),
   50.0 g acrylic acid (AA),
   40 g of a 50% sodium hydroxide solution,
   0.027 g methylene-bis-acrylamide,
   0.45 g of a commercial solution with 40% sodium diethylene triamine pentaacetate.
The pH value of the aqueous phase is adjusted to 5.2 by adding the required amount of acrylic acid or of soda. The total amount of aqueous phase is then adjusted to 680 g by addition of water.
(iii) The aqueous phase is then dispersed under stirring in the oil phase, then this combination is subjected to the action of a strong shearing by means of a turbine of Ultra-Turrax™ or Silverson™ type. The inverse emulsion thus obtained is then subjected to nitrogen bubbling so as to remove the dissolved oxygen.
(iv) After cooling the inverse emulsion to about 8-10° C., the polymerization reaction is initiated by adding an oxyreducing pair: cumene hydroperoxide/sodium metabisulfite. The temperature rises up to about 80° C. and the polymerization reaction is allowed to continue until a temperature stage indicating the end of the reaction is reached.
(v) The reaction medium is then maintained at this temperature so as to eliminate the residual monomers. 35 g SIMULSOL™ P7 (heptaethoxylated lauric alcohol) are then added at about 35° C. The desired inverse latex is collected after filtration.

Example 5

Preparation of a Copolymer Inverse Latex (AM-AA=80/20) Partly Salified, in Form of Sodium Salt Crosslinked with Methylene Bis(Acrylamide)

The procedure is the same as in Example 4, but using twice as much methylene-bis(acrylamide), i.e. 0.054 g, and the desired inverse latex is obtained.

Evaluation of the Properties of the Microgels from the Inverse Latex Prepared According to Example 3
1: Viscosity Measurement
Microgels with different concentrations of the inverse latex prepared according to Example 3, in a water containing 2% NaCl, were prepared.
The following table gives the viscosities obtained at 30° C. (in mPa·s) at various concentrations C in the water (Low Shear Rheometer, shear rate 1 and 100 s$^{-1}$):

|  | Emulsion viscosities (mPas) | |
| --- | --- | --- |
| C | Shear rate: 1 s$^{-1}$ | Shear rate: 100 s$^{-1}$ |
| Inverse latex concentration (% by mass) 0.3 | 3 | 2.8 |
| 0.5 | 17 | 12 |
| 0.6 | 30 | 20 |
| 0.77 | 80 | 40 |

2: Tests on Silicon Carbide
Evaluation of the performances of the microgels in a porous medium is achieved on silicon carbide type media in form of relatively mono-disperse powder, marketed with different grain sizes. Once packed, this material allows to obtain a good reproducibility of the clumps in terms of pore structure and of permeability of the sample for a given grain size. It therefore constitutes a good model porous medium.
The silicon carbide powder is packed in a column provided with two end pieces. Its initial permeability k is determined with water. The fluids (water, microgel solution, elution water, oil . . . ) are injected into the porous medium at constant flow rate. The pressure drop is determined at the clump boundaries and recorded throughout the injection procedure.
Good propagation of the microgels (controlled by in-line measurement of the viscosity) is checked in the media whose pore restriction dimension is at least more than three times the size of the microgels.
The water or oil permeability reductions are determined by alternate injection of these two fluids after injection of the microgel solution. The water permeability reduction allows, knowing the pore dimension of the porous medium, to evaluate the thickness of the adsorbed microgel layer and thus to determine the size of the microgels in their adsorbed form.
A selective permeability reduction is observed with a water permeability (Rkw) reduction, without notable oil permeability (Rko) reduction (K permeability in Darcy, $\epsilon_H$ adsorbed layer thickness, in micrometer).
Experimental conditions: Temperature T=30° C., water +2% NaCl (viscosity 0.85 mPa·s), Marcol 52 oil (viscosity 8.6 mPa·s), microgel concentration 0.1%.

|  | K (darcy) | Rkw | Rko | $\epsilon_H$ (μm) |
|---|---|---|---|---|
| SiC 50 μm | 1.1 | 4.5 | 1.3 | 1.5 |
| SiC 80 μm | 2.8 | 2.1 | 1 to 1.5 | 1.4 |

3: Tests on Berea Sandstone (Conditions Similar to Those of the Previous Test)

|  | K (darcy) | Rkw | Rko | $\epsilon_H$ (μm) |
|---|---|---|---|---|
| Berea sandstone | 0.2 | 20 | 1.2 | 1.5 |

4: Microgel Size Determination by Means of the Light Diffusion Method (Static and Dynamic Diffusion, Also Referred to as Photon Correlation Spectroscopy)

The size determined is of the order of 2 μm (0.1% microgel concentration) and confirms the values obtained upon injection in the silicon carbide clumps, and from the adsorption evaluation.

5: Thermal Stability

A test wherein a 150° C. temperature is maintained under pseudo-anaerobic conditions for 3 months without viscosity loss showed that, in relation to non-crosslinked conventional polymers, the microgels obtained from the inverse latexes according to the invention remain more stable. This property is explained by the presence of crosslinking points.

Experimental conditions: water +2% NaCl, microgel concentration 0.3%.

6: Mechanical Stability

The microgels are robust from a mechanical point of view and they withstand high shear stresses. In fact, no viscosity loss is observed after shearing at 10,000 rpm (Ultra-Turrax™) for 10 minutes.

Experimental conditions: water +2% NaCl, ambient temperature, microgel concentration between 0.04% and 3%.

7: Electrolyte Stability

The microgels are nearly insensitive to the salinity in a range from 20 to 200 g/l TDS, in the presence or not of bivalent ions.

Experimental conditions: ambient temperature, microgel concentration 0.01%.

8: pH Value Stability

The microgels are nearly insensitive to the pH value in a range between 4 and 11.

Experimental conditions: ambient temperature, microgel concentration 0.01%.

The invention claimed is:

1. A method of treating formations, wherein the following stages are carried out:
preparing a liquid composition comprising microgels by mixing in a solvent, under stirring, an amount representing 0.01% to 60% by mass of said composition of:
either an inverse latex comprising an oil phase, an aqueous phase, at least one water-in-oil (W/O) type emulsifier, at least one oil-in-water (O/W) type emulsifier, 20% to 60% by weight of a crosslinked anionic polyelectrolyte based on either at least one strong acid function monomer copolymerized with at least one neutral monomer crosslinked with a crosslinking agent in a molar proportion expressed in relation to the monomers used of 0.002% to 0.5%, or a weak acid function monomer copolymerized with at least one neutral monomer crosslinked with a crosslinking agent in a molar proportion expressed in relation to the monomers used of 0.002% to 0.5%,
or a powdered polymer obtained by azeotropic distillation, atomization or precipitation of said inverse latex,
injecting said composition into the porous and permeable formation.

2. A method as claimed in claim 1, wherein said solvent is an aqueous fluid, an organic fluid or a mixture thereof.

3. A method as claimed in claim 1, wherein the crosslinking agent of said anionic polyelectrolyte is selected from among ethylene glycol dimethacrylate, diethylene glycol diacrylate, sodium diallyloxyacetate, ethylene glycol diacrylate, diallyl urea, triallylamine, trimethylol propanetriacrylate or methylene-bis-(acrylamide) or an organometallic type compound selected from column IV in Mendeleiev's table (Ti, Zr, Hf, Th).

4. A method as claimed in claim 1, wherein the strong acid function of the monomers is selected from among the sulfonic acid function and the phosphonic acid function, and wherein said strong acid function monomers are selected from among: styrenesulfonic acid, partly or totally salified, and 2-methyl 2-[(1-oxo 2-propenyl)amino] 1-propanesulfonic acid (also referred to as 2-acrylamido 2-methyl propanesulfonic acid), partly or totally salified.

5. A method as claimed in claim 1, wherein the weak acid function of the monomers is the partly salified carboxylic acid function, and wherein said weak acid function monomers are selected from among: acrylic acid, methacrylic acid, itaconic acid, maleic acid or 3-methyl 3-[(1-oxo 2-propenyl)amino] butanoic acid, partly or totally salified.

6. A method as claimed in claim 1, wherein the neutral monomers are selected from among acrylamide, methacrylamide, diacetoneacrylamide, dimethylacrylamide, N-isopropyl acrylamide, (2-hydroxy ethyl) acrylate, (2,3-dihydroxy propyl)acrylate, (2-hydroxy ethyl)methacrylate, (2,3-dihydroxy propyl)methacrylate, an ethoxylated derivative of molecular weight ranging between 400 and 1000 of each one of these esters or vinyl pyrrolidone.

7. A method as claimed in claim 1 wherein, for the strong acid function or weak acid function monomers, the term salified indicates more particularly the alkaline metal salts such as sodium or potassium salts, the nitrogenated base salts such as ammonium salt or monoethanolamine salt (HO—CH$_2$—CH$_2$—NH$_4^+$).

8. A method as claimed in claim 1, wherein the water-in-oil (W/O) type emulsifier is a single surfactant or a mixture of surfactants, provided that the mixture has a sufficiently low HLB value to induce water-in-oil emulsions, said emulsifier is selected from among the following surfactants: sorbitan esters, such as sorbitan oleate, sorbitan isostearate, sorbitan sesquioleate, polyethoxylated sorbitan esters, notably pentaethoxylated sorbitan mono-oleate or pentaethoxylated sorbitan isostearate, diethoxylated oleocetylic alcohol, polyesters of molecular weight ranging between 1000 and 3000, products of the condensation between a poly(isobutenyl) succinic acid or its anhydride and a polyethylene glycol, block copolymers of molecular weight ranging between 2500 and 3500.

9. A method as claimed in claim 1, wherein oil-in-water type emulsifiers are emulsifiers having a sufficiently high HLB value to provide oil-in-water emulsions, said emulsifier being selected from among: ethoxylated sorbitan esters, notably polyethoxylated sorbitan oleate with 20 moles ethylene oxide, polyethoxylated sorbitan laurate with 20 moles ethylene oxide, polyethoxylated ricine oil with 40 moles ethylene oxide, decaethoxylated oleodecylic alcohol, heptaethoxylated lauric alcohol, decaethoxylated nonylphenol, polyethoxylated sorbitan hexaoleates and mixtures thereof.

10. A method as claimed in claim 1, wherein the oil phase consists of either a commercial mineral oil containing saturated hydrocarbons such as paraffins, isoparaffins, cycloparaffins, having at ambient temperature a density ranging between 0.7 and 0.9 kg/dm$^3$ and a boiling-point temperature above about 180° C., or a synthesis oil, or a vegetable oil or any mixture of such oils.

11. A method as claimed in claim 1, wherein said composition is injected into a formation comprising a high water permeability zone so as to selectively reduce the water permeability, notably in oil, gas reservoirs or in gas storage facilities.

12. A method as claimed in claim 1, wherein said composition is injected into a formation containing unconsolidated sand.

13. A method as claimed in claim 1, wherein said composition is injected into a sand foundation type formation so as to reduce the permeability thereof.

14. A method as claimed in claim 1, wherein the crosslinked anionic polyelectrolyte based on either at least one strong acid function monomer copolymerized with at least one neutral monomer or the weak acid function monomer copolymerized with at least one neutral monomer is contained in an amount of preferably 25% to 45% by weight in the inverse latex.

15. A method as claimed in claim 1, wherein the at least one neutral monomer or the weak acid function monomer copolymerized with at least one neutral monomer is crosslinked with a crosslinking agent in a molar proportion expressed in relation to the monomers used of 0.002% to 0.25%.

* * * * *